United States Patent [19]

Schwartz

[11] Patent Number: 5,172,605

[45] Date of Patent: Dec. 22, 1992

[54] ELECTRIC MOTOR GEARBOX

[75] Inventor: Glenn R. Schwartz, Des Plaines, Ill.

[73] Assignee: Molon Motor & Coil Corp., Rolling Meadows, Ill.

[21] Appl. No.: 805,979

[22] Filed: Dec. 12, 1991

Related U.S. Application Data

[63] Continuation-in-part of Ser. No. 627,506, Dec. 14, 1990, abandoned.

[51] Int. Cl.⁵ .................... F16H 1/10; F16H 57/02
[52] U.S. Cl. .................... 74/421 A; 74/606 R
[58] Field of Search .................... 74/421 A, 606 R; 318/474; 192/150

[56] References Cited

U.S. PATENT DOCUMENTS

| | | | |
|---|---|---|---|
| 2,065,753 | 12/1936 | Schmitter et al. | 74/421 A |
| 2,152,607 | 3/1939 | Schmitter et al. | 74/421 A X |
| 2,184,669 | 12/1939 | Hansen | 74/606 R |
| 2,320,379 | 1/1943 | Niekamp | 74/421 A |
| 2,497,219 | 2/1950 | Haumann | 74/606 R |
| 3,364,772 | 1/1968 | Easton | 74/421 A |
| 3,434,366 | 3/1969 | Raso et al. | 74/421 |
| 4,823,637 | 4/1989 | Taguchi et al. | 74/606 R |

OTHER PUBLICATIONS

Lectrigear, Ajax Flexible Coupling Company, Westfield, New York (Prior May 27, 1935)—Advertisement.
Link-Belt Motorized Reducers, Link-Belt Company, Feb. 1935—Advertisement.

Primary Examiner—Leslie A. Braun
Assistant Examiner—Julie Krolikowski
Attorney, Agent, or Firm—Joseph Scafetta, Jr.

[57] ABSTRACT

An electric motor gearbox for a vending machine has four main parts: a housing, a minimotor, a printed circuit board, and an assembly of gears. An output pinion and an output gear are so strong that they permit the minimotor to stall before the assembly fails in response to jamming of a product item in the vending machine. Also, the motor gearbox is less prone to failure caused by constant starting and stopping, excessive flexibility of a gearbox housing cover, intermittent vibrations, and the like.

4 Claims, 6 Drawing Sheets

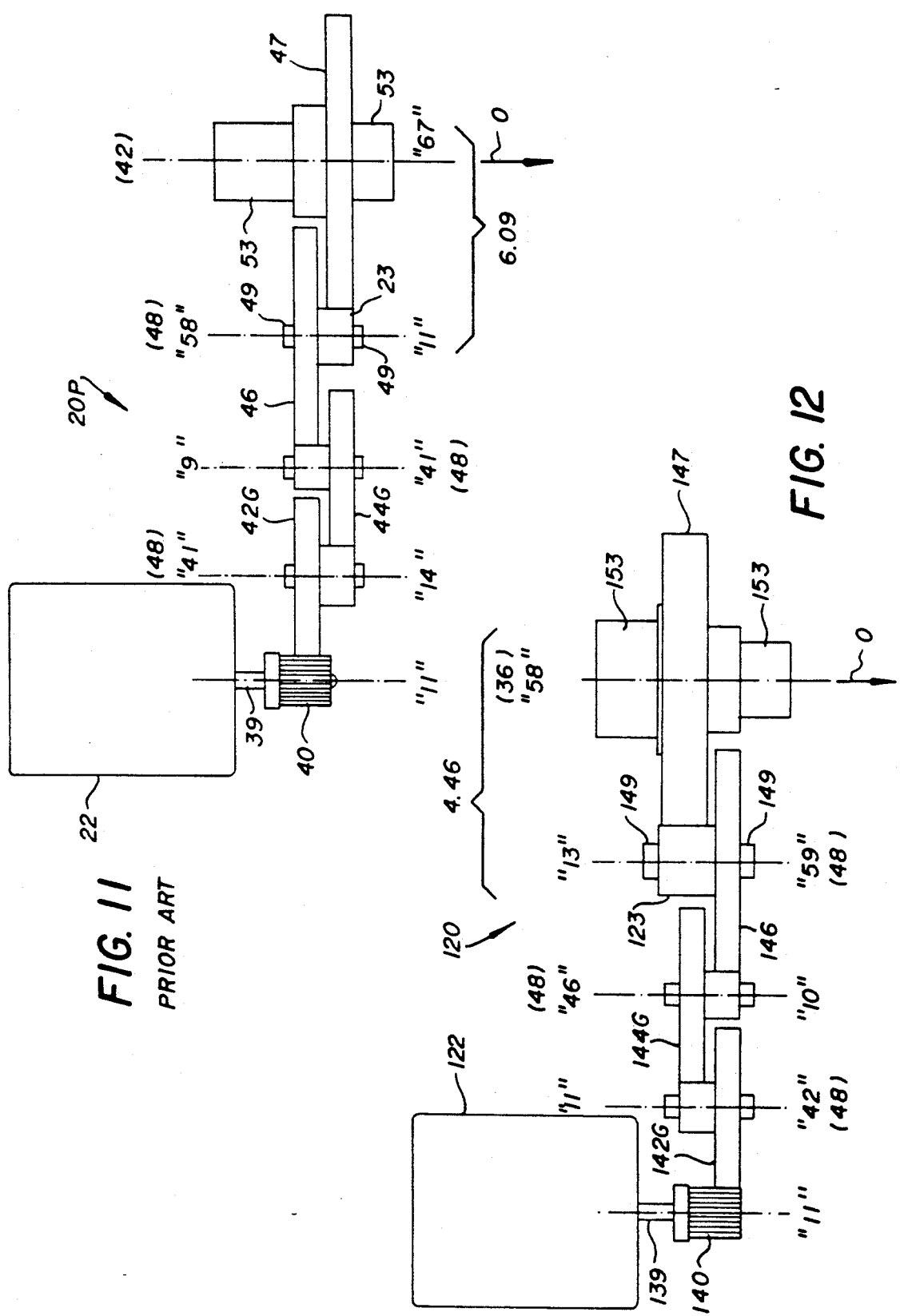

ELECTRIC MOTOR GEARBOX

CROSS-REFERENCE TO RELATED APPLICATIONS

This application is related to Design Patent Application Ser. No. 07/531,539 filed on June 1, 1990, now Pat. No. D327,051 in the name of the same inventor by the same assignee. This application is also a continuation-in-part of Utility Patent Application Ser. No. 07/627,506 filed on Dec. 14, 1990, now abandoned.

BACKGROUND OF THE INVENTION

1. Field of the Invention

This invention relates to machine elements and mechanisms generally, but more particularly to gear casings.

2. Description of the Related Art

The incorporation of an electric motor gearbox into a mechanical vending machine for the purpose of delivering a desired product to a purchaser is a well-known concept. An early example of such a vending machine is shown in U.S. Pat. No. 2,497,219 which issued to Joseph Haumann on Feb. 14, 1950.

However, early vending machines, such as the one patented by Haumann, did not permit the purchaser to view the product before coins were deposited. Also, the choice of products sold in such early vending machines was limited to one or a few items.

Eventually, these early vending machines were replaced by so-called "glass-fronted" machines 10, one of which is shown in FIG. 1. These glass-fronted machines 10 are still in use and are popular with consumers because items for sale can be viewed and also because of the variety of choices offered. For example, the so-called "Snack Center" machine manufactured by Crane National Vendors of Bridgeton, Missouri, holds up to 53 selections and 1,100 individual items in all.

As shown in FIG. 2, each machine 10 has a plurality of shelves 12 which individually slide out for loading and unloading by service personnel. Each shelf 12 has a plurality of columns 14 separated by dividers 16 that serve to segregate different items to be sold. At the rear of each shelf 12, there is a portion 18 reserved for a plurality of electric motor gearboxes (not shown in FIG. 2, but see FIGS. 3 and 4). In FIG. 3, a prior art motor 20P is illustrated and has four main parts: a gearbox housing 26, a miniature motor (hereinafter "minimotor") 22, a printed circuit (hereinafter "PC") board 24, and an assembly of gears inside the gearbox housing 26.

Returning to FIG. 2, it can be seen that the deposit of coins in a slot 28 and the pushing of selection buttons 30 activate the electric motor gearbox 20P for a column 14 so that a spiral 32 turns in the direction of an arrow A until the selected item I (not shown in FIG. 2, but see FIG. 1) is moved forwardly and the item I reaches a front edge 12E of the shelf 12.

Returning to FIG. 1, it can be seen that the item I has reached the edge 12E of the shelf 12. Ordinarily, the item I will be dropped over the edge 12E and will fall down into a space having a door 34 through which the purchaser reaches to take out the item I.

Unfortunately, in the glass-fronted vending machines 10 using the prior art motor gearbox 20P of FIG. 3, a spiral 32 frequently becomes jammed by the item I if it fails to drop off the edge 12E of the shelf 12. The prior art electric motor gearbox 20P continues to run until the gearing fails in its output pinion 23 at its teeth 38 (see FIG. 7) before the minimotor 22 reaches its stall point.

Furthermore, if the prior art electric motor gearbox 20P of FIG. 3 does not fail in this manner, it eventually ceases to function because of "fatigue," i.e., constant starting and stopping of the minimotor 22 leads to failure. Also, since the gearbox housing 26 is somewhat flexible, intermittent vibrations contribute to hastening this failure.

Although U.S. Pat. No. 2,184,669, which issued to William L. Hansen on Dec. 26, 1939, suggests that a gear casing may have mated ribs on both the inside cover and the housing side thereof in order to provide "the utmost rigidity and freedom from vibration" (at page 2, col. 2, lines 24–27), such a gear casing is unsuitable for the specialized requirements of the food vending machine 10.

Consequently, as a result of such prior art failures, the disappointed purchaser would lose the money deposited, if no one was available to make a refund. Also, the merchant having the vending machine 10 would lose a sale and the snack food seller would have the machine 10 out of order for an undetermined length of time. Therefore, revenue would be lost for both the merchant and the food seller. Occasionally, the disappointed purchaser would become irate and vandalize the machine 10, thus causing greater losses for both the merchant and the food seller.

As a result, it has been a problem in the prior art to develop an electric motor gearbox that will cease functioning, but will not fail, thus preventing the disabling of the vending machine 10 when one of the items I becomes jammed and fails to drop from the shelf 12.

SUMMARY OF THE INVENTION

The present invention relates to an electric motor gearbox that ceases to function by stalling out before the gearing will fail whenever an item in a vending machine becomes jammed.

A primary object of the present invention is the prevention of the disabling of the vending machine of the glass fronted type when the item selected by the purchaser becomes jammed and fails to drop from the shelf.

A secondary object of the present invention is to make the disabling of the glass-fronted vending machine less likely because of motor gearbox failure caused by fatigue induced by constant starting and stopping, excessive flexibility of the gearbox housing cover, intermittent vibrations, and the like.

One advantage of the present invention over the prior art is that the new motor gearbox is more efficient and less expensive than either its predecessor or its competitors.

Another advantage of the present invention over the prior art is that the new motor gearbox prevents premature failure and reduced wear on the gearing and other movable parts.

These objects and other advantages of the present invention will become more readily apparent from a careful examination of the following brief description of the drawings and the subsequent detailed description of the preferred embodiment.

BRIEF DESCRIPTION OF THE DRAWINGS

FIG. 11 is a side elevational schematic view of the prior art gearing taken along line 11—11 in FIG. 7.

FIG. 12 is a side elevational schematic view of the gearing of the present invention taken along line 12—12 in FIG. 9.

DETAILED DESCRIPTION OF THE PREFERRED EMBODIMENT

Figure 1:
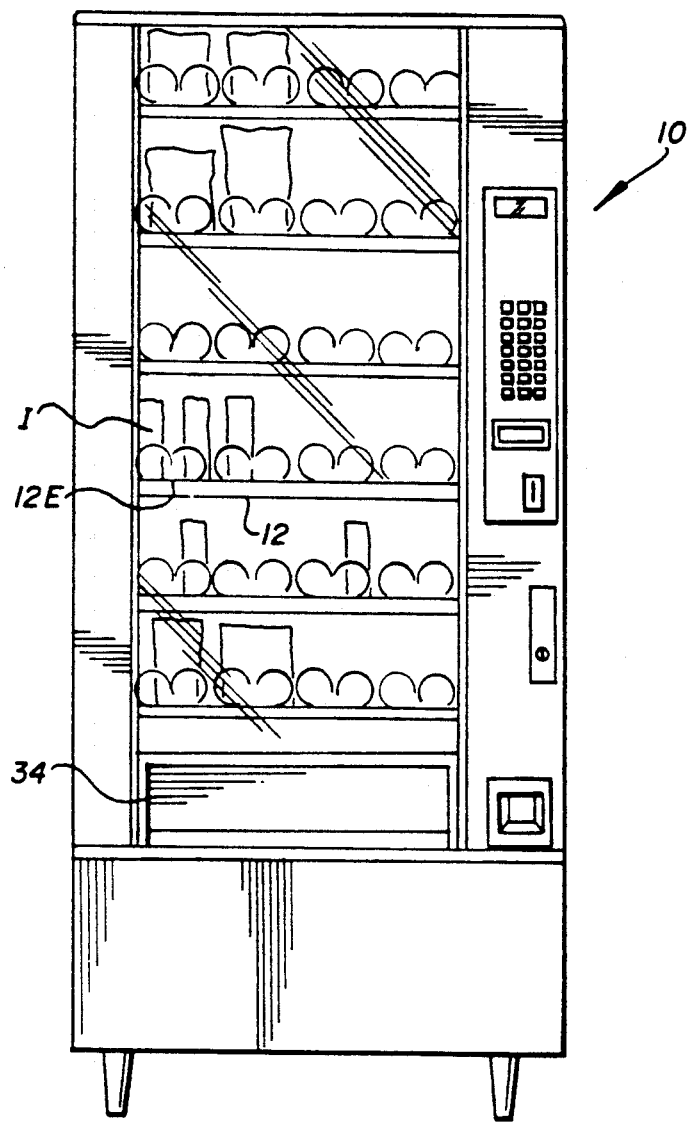
FIG. 1 is a front elevational view of the vending machine in which the electric motor gearbox of the present invention is incorporated.
Figure 4:
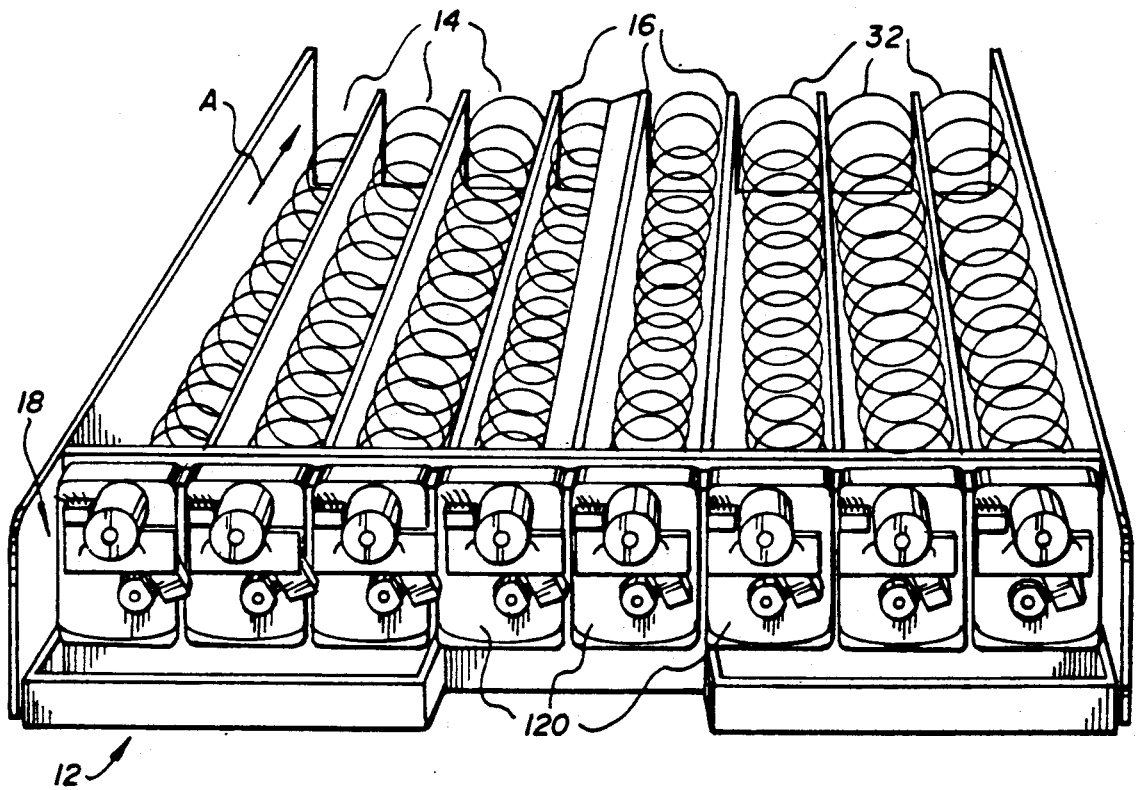
FIG. 4 is a rear perspective view of the motor gearbox of the present invention, as it is incorporated into the rear portion of the shelf shown in FIG. 2.

In FIG. 4, the rear portion 18 of the shelf 12 has incorporated therein a plurality of motor gearboxes 120 of the present invention. Each motor gearbox 120 turns the spiral 32 in the direction of the arrow A. Each spiral 32 is separated from adjacent spirals 32 by the dividers 16 which segregate each type of the snack food items I (not shown in FIG. 4, but see FIG. 1) into the columns 14.

Figure 2:
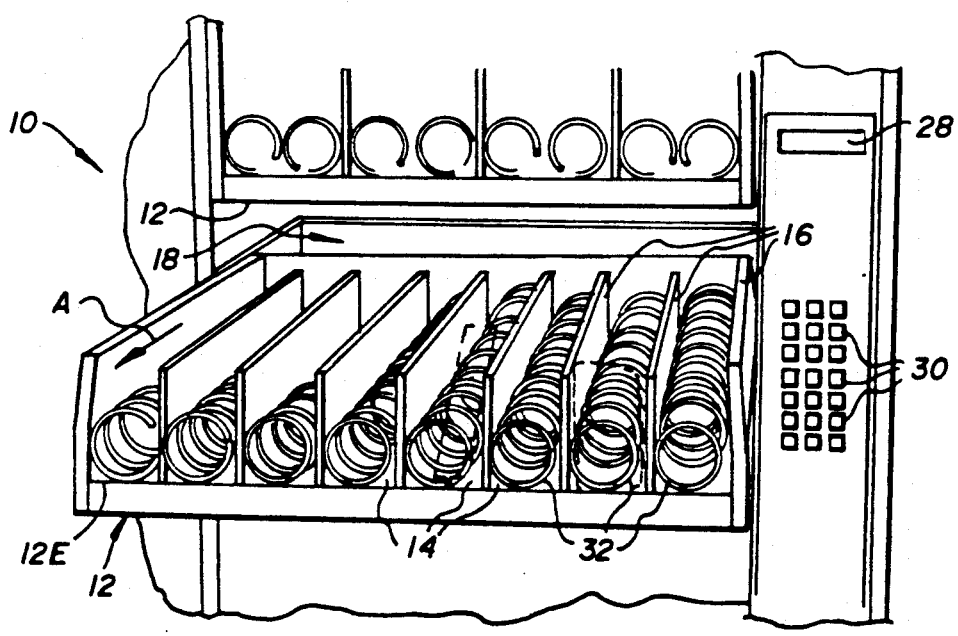
FIG. 2 is a frontal perspective view of one shelf of the vending machine shown in FIG. 1.
Figure 6:
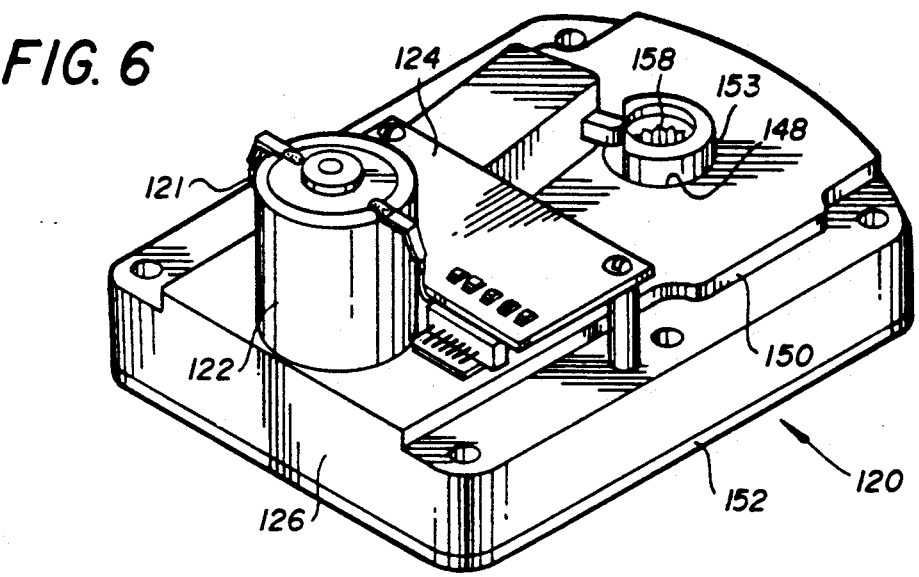
FIG. 6 is a corner perspective view of the motor gearbox of the present invention incorporated in the rear portion (shown in the foreground) of that part of the shelf shown in FIG. 5.

The motor gearbox 120 of the present invention is seen in greater detail in FIG. 6. Each motor gearbox 120 includes a PC board 124 which has leads 121 that extend to the minimotor 122. This PC board 124 receives and processes electrical signals from the selection buttons 30 (not shown in FIG. 6, but see FIG. 2) pressed by the purchaser. The PC board 124 then sends electrical signals via the leads 121 to the minimotor 122 which is activated to turn internal gearing (not shown in FIG. 6, but see FIG. 9) inside a gearbox housing 126. The gearing turns inside the gearbox housing 126 to drive an output pinion 123 having a plurality of teeth 138.

Figure 7:
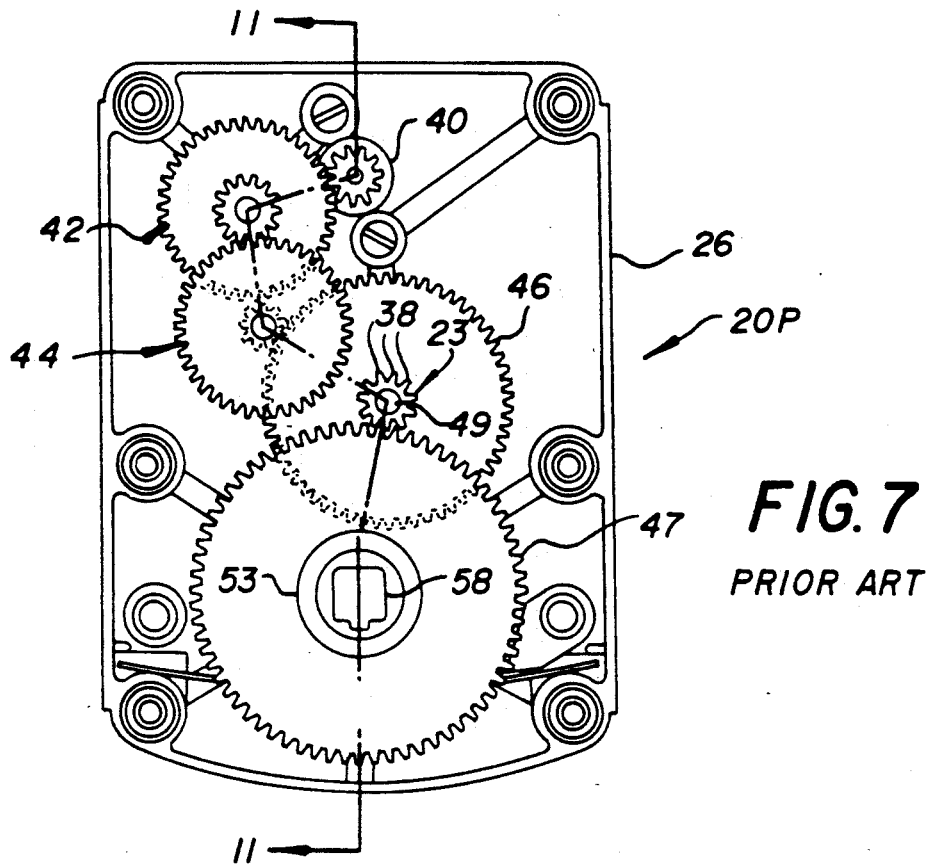
FIG. 7 is a top plan view of the gearing inside the prior art motor gearbox shown in FIG. 3.
Figure 9:
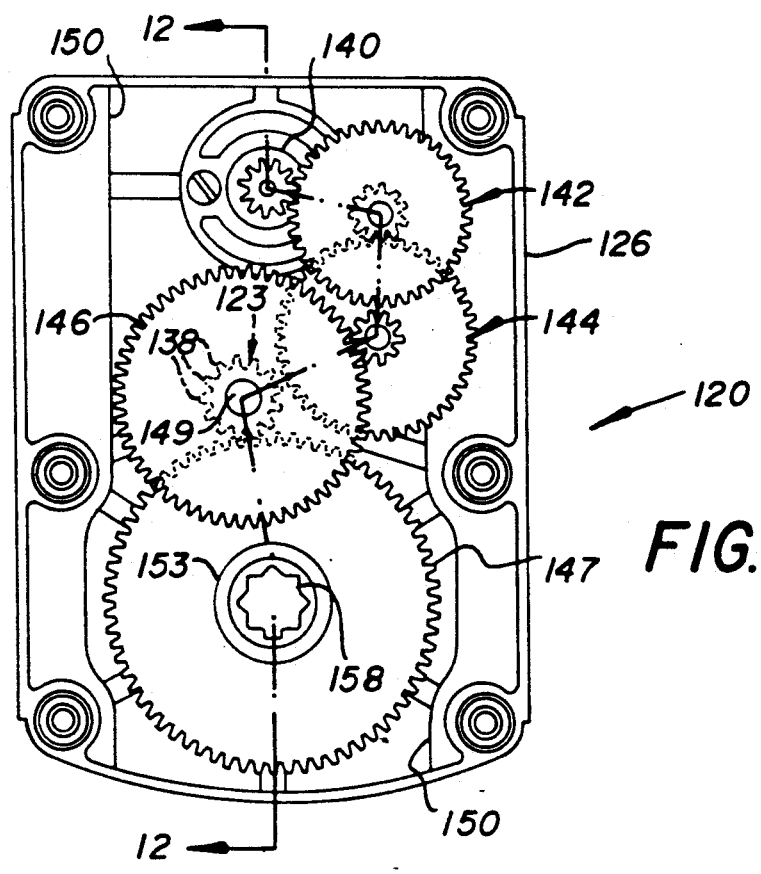
FIG. 9 is a top plan view of the gearing inside the motor gearbox of the invention shown in FIG. 6.

At this point, it should be noted that the size of the output pinion 123 is larger than the size of an output pinion 23 in a prior art motor gearbox 20P shown in FIG. 7. Similarly, the teeth 138 in the present invention, as best seen in FIG. 9, are more numerous than prior art teeth 38 in the motor gearbox 20P of FIG. 7.

Figure 5:
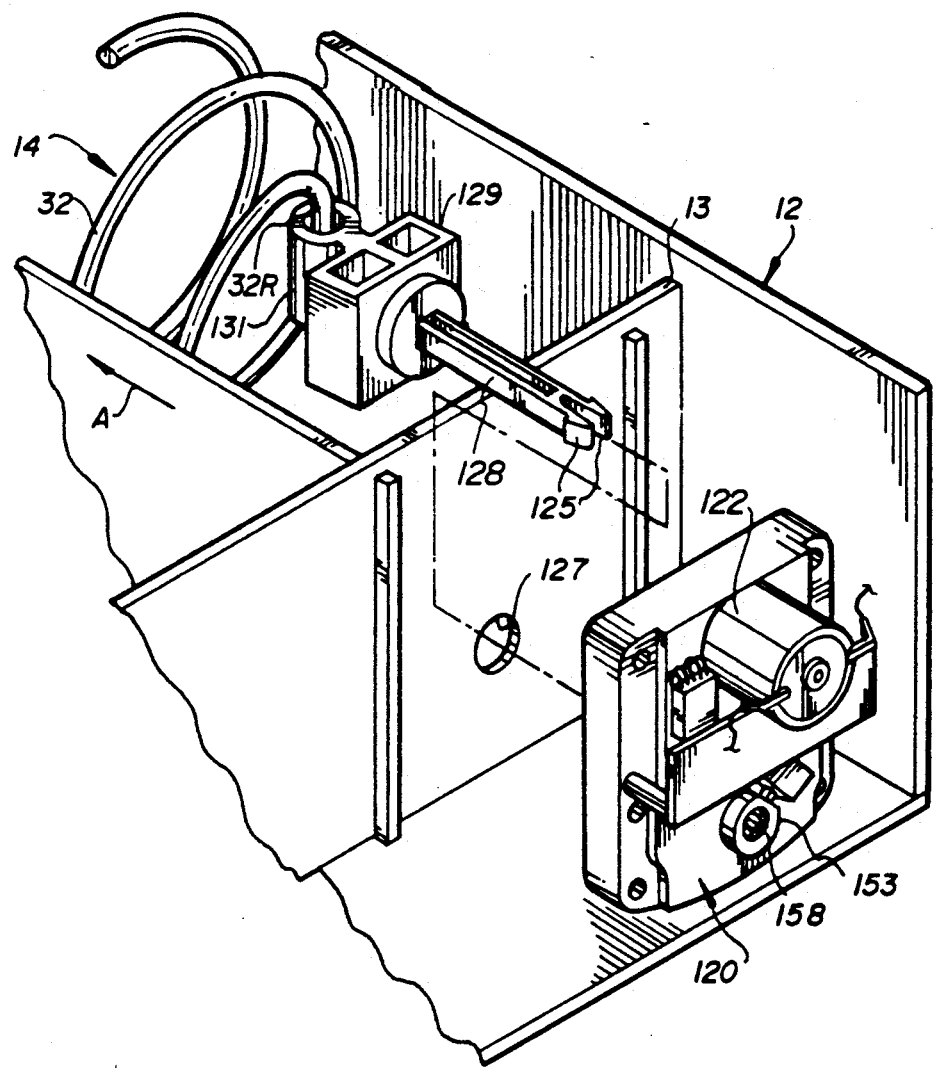
FIG. 5 is a partially exploded perspective view of the motor gearbox of the present invention, as it is mounted in the rear portion (shown in the foreground) of part of the shelf shown in FIG. 4.

Referring now to FIG. 5, it can be seen that the motor gearbox 120 is mounted onto a rear wall 13 of the shelf 12. Internal teeth 158 of an output shaft 153 engage a shank 128 having flexible prongs 125 that extend through a hole 127 in the rear wall 13 of the shelf 12. The flexible prongs 125 extend from a coupler 129 having an integral barrel 131 into which a rear end 32R of the spiral 32 is retained. When the flexible prongs 125 are pinched together, they may be pushed through a bore around which the internal teeth 158 are arranged. After the flexible prongs 125 are released, the shank 128 attached to the prongs 125 engages the internal teeth 158. The minimotor 122 drives the output shaft 153 to rotate the internal teeth 158 which are formed integrally therewith. Thus, as the internal teeth 158 turn the shank 128 on the coupler 129, the integral barrel 131 likewise turns the spiral 32 so that the column 14 of items I (not shown in FIG. 5, but see FIG. 1) moves forwardly towards the front edge 12E (not shown in FIG. 5, but see FIG. 2) of the shelf 12 in the direction of the arrow A.

The discussion will now turn to gear trains of both the prior art and the present invention. The gear train of the prior art motor gearbox 20P is shown inside the motor gearbox 26 in FIG. 7 while the gear train of the motor gearbox 120 of the present invention is shown inside the gearbox housing 126 in FIG. 9.

In regard to the gear trains, it may be beneficial to review some basic principles of gearing. Torque is a way of defining "moment" at a distance. If the number of gear teeth is divided by the number of pinion teeth, one obtains a gear ratio of gear teeth to pinion teeth. For example, if the number of gear teeth is 60 and the number of pinion teeth is 15, the gear ratio is 4. Thus, through any gear reduction, the torque is multiplied by the gear ratio, less efficiency losses due to friction.

Referring now to the prior art motor gearbox 20P of FIG. 7, it can be seen that mechanical input from the minimotor 22 (not shown in FIG. 7, but see FIG. 3) starts at a motor pinion 40 and works through a first stage gear/pinion cluster 42, a second stage gear/pinion cluster 44, a third gear 46, the output pinion 23, an output gear 47, and an output shaft 53. Unfortunately, for the various reasons previously stated, the teeth 38 in the output pinion 23 fail whenever one of the items I jams or fails to release from the vending machine 10.

Turning now to the motor gearbox 120 of the present invention shown in FIG. 9, the problem in the prior art was solved by replacing the output pinion 23 in FIG. 7 with the new and improved output pinion 123 having the teeth 138 seen in FIG. 9. Thus, in the present invention, mechanical input from the minimotor 122 (not shown in FIG. 9, but see FIG. 6) starts at a motor pinion 140 and works through a first stage gear/pinion cluster 142, a second stage gear/pinion cluster 144, a third gear 146, the new output pinion 123, an output gear 147, and the new output shaft 153. Therefore, the gear assembly does not fail whenever one of the items I jams or fails to release from the vending machine 10, but rather causes the minimotor 122 (not shown) to stall out. Thus, the output pinion 123 of the present invention is a substantial improvement over the prior art output pinion 23. The continued functioning of the new output pinion 123 was achieved by making the following changes which together combine to make the present invention an unobvious improvement over the prior art output pinion 23: first, increased number of teeth; second, increased diametral pitch; and third, increased face width. Since the first change has been discussed previously, only the second and third changes will be discussed now.

Concerning the second change, it should be noted that diametral pitch relates to the size of each tooth. A coarser diametral pitch for a given pitch diameter results in fewer but larger teeth. Thus, when it is said that the diametral pitch is made coarser, one means that the number of teeth per inch of pitch diameter is decreased.

As a side comment, it is pointed out that an increased pitch diameter results from a combination of the first and second changes; i.e., increasing the number of teeth and making coarser the diametral pitch.

Concerning the third change, it must be initially stated that the face width is a measurement taken across a pinion or a gear in an axial direction. Thus, to increase the face width, the output pinion 123 was made wider, thereby significantly increasing its strength. The wider output pinion 123 and its mating output gear 147 require that the gearbox housing 126 has a thicker raised portion 150, best shown in FIG. 6. This thicker raised portion 150 allows the gearbox housing 126 to accommodate more heavy duty pinions and gears inside, while leaving the gearbox housing 126 thin enough in all other areas so that the mounting requirements for the present invention onto the rear wall 13 of the shelf 12 shown in FIG. 5 are still satisfied.

Also, the thicker raised portion 150 reinforces the gearbox housing 126, thus making the entire motor gearbox 120 more rigid and less flexible so that the motor gearbox 120 can withstand vibrations and high loads. Furthermore, wear is reduced and premature failure is prevented for the motor gearbox 120.

By decreasing the ratio in an output set (pinion and gear together), the torque capability of the output pinion 123 is enhanced in the present invention. In other words, the ability of the output pinion 123 to handle torque is improved.

Also, by decreasing the ratio in the output set, the output pinion 123 is able to transmit torque at a rate greater than a rate caused by increased torque due to a gear ratio change.

Theoretically, there is an optimum gear ratio of about 3.7 to 1. This ratio is considered the most efficient from a theoretical standpoint. The present invention has a gear ratio of about 4.46 to 1.

For the purpose of continuing the discussion of the ratio in the output set, reference is now made to FIGS. 11 and 12. In the prior art motor gearbox 20P shown in FIG. 11, the application of an electrical current to the minimotor 22 causes rotation of a motor shaft 39 which drives the motor pinion 40. From the motor pinion 40, torque is transmitted through a first gear 42G, a first pinion (unnumbered), a second gear 44G, a second pinion (unnumbered), the third gear 46, the output pinion 23, and the output gear 47 which directly drives the output shaft 53 and, in turn, the spiral 32 (not shown) in the direction of an arrow O. The number of teeth for each pinion and gear is indicated in quotation marks along their center lines while the diametral pitches are indicated in parentheses in FIG. 11. Thus, for example, the motor pinion 40 has 11 teeth, the first gear 42G has 41 teeth, the second gear 44G has 41 teeth, and the third gear 46 has 58 teeth. The number of teeth of other pinions and gears are not stated herein, but are clearly shown in FIG. 11. Similarly, the diametral pitch is 48 for the first gear 42G, the first pinion (unnumbered), the second gear 44G, the second pinion (unnumbered), and the third gear 46, while the diametral pitch is 42 for the output pinion 23 and for the output gear 47. The output gear ratio is determined by dividing the number of 67 teeth on the output gear 47 by the number of 11 teeth on the output pinion 23. Therefore, the output gear ratio for the prior art motor gearbox 20P shown in FIG. 11 is 6.09.

In the present invention shown in FIG. 12, the application of an electrical current to the minimotor 122 causes rotation of a motor shaft 139 which drives the motor pinion 140. From the motor pinion 140, torque is transmitted through a first gear 142G, a first pinion (unnumbered), a second gear 144G, a second pinion (unnumbered), the third gear 146, the output pinion 123, and the output gear 147 which directly drives the output shaft 153 and, in turn, the spiral 32 (not shown) in the direction of the arrow O. As in FIG. 11, the number of teeth is indicated in quotation marks along their center lines while the diametral pitches are indicated in parentheses in FIG. 12. Thus, the motor pinion 140 has 11 teeth, the first gear 142G has 42 teeth, the second gear 144G has 46 teeth, and the third gear 146 has 59 teeth. The diametral pitch is 48 for the first gear 142G, the first pinion (unnumbered), the second gear 144G, the second pinion (unnumbered), and the third gear 146, while the diametral pitch is 36 for the output pinion 123 and the output gear 147. The output gear ratio is the number of teeth 58 on the output gear 147 divided by the number of teeth 13 on the output pinion 123. Therefore, the output gear ratio for the motor gearbox 120 shown in FIG. 12 is 4.46. This value of 4.46 for the present invention is much closer to the theoretical optimum of 3.7 than the value of 6.09 for the prior art motor gearbox 20P of FIG. 11. Thus, the motor gearbox 120 of the present invention is more efficient than the prior art motor gearbox 20P.

Figure 3:
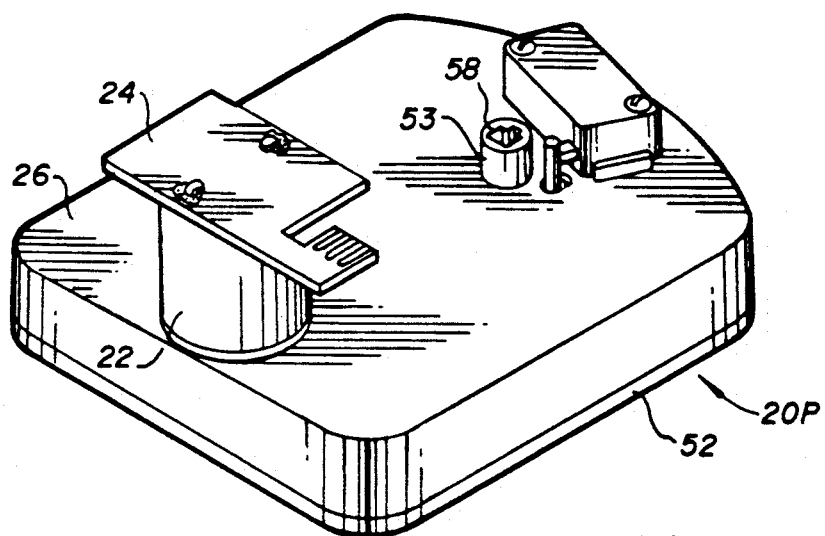
FIG. 3 is a corner perspective view of the prior art motor gearbox incorporated in the rear portion of the shelf shown in FIG. 2.
Figure 8:
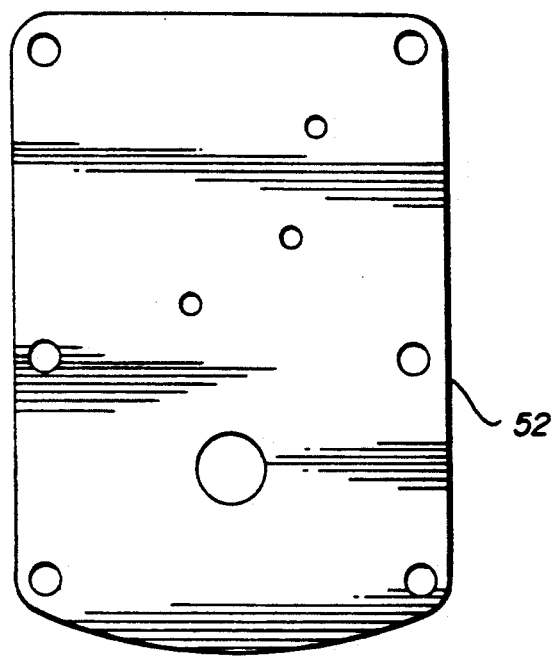
FIG. 8 is a bottom plan view of the housing cover, flipped over, from the inside of the prior art motor gearbox shown in FIG. 3.
Figure 10:
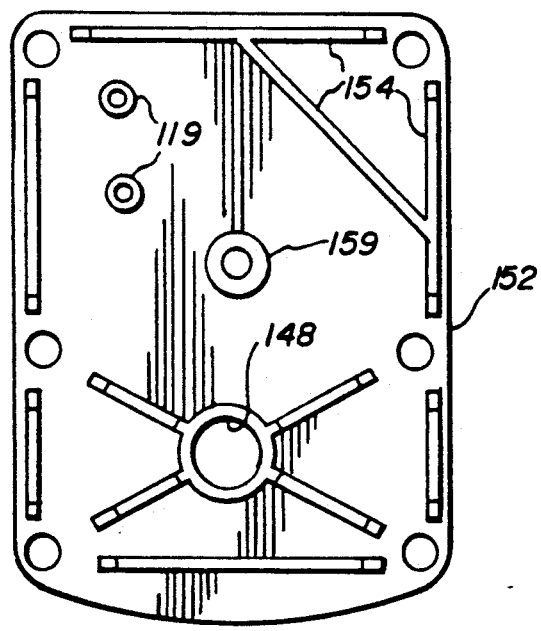
FIG. 10 is a bottom plan view of the housing cover, flipped over, from the inside of the motor gearbox of the present invention shown in FIG. 6.

Referring now to FIGS. 8 and 10, a housing cover 52 is shown in FIG. 8 and is placed under the gearbox housing 26 for the prior art motor gearbox 20P seen in FIG. 3. As it is illustrated in FIG. 8, there is a plurality of holes in the housing cover 52 into which shafts protrude for their respective gears and pinions. Because the housing cover 52 is not reinforced, it is flexible and can bend under a load.

In FIG. 10, a housing cover 152 is shown for placement under the gearbox housing 126 of the present invention seen in FIG. 6. As shown in FIG. 10, there is also a plurality of holes into which shafts protrude for their respective gears and pinions. For example, the hole 148 serves as an opening for the output shaft 153, as discussed previously in regard to FIG. 6.

It can be readily seen by a comparison of the housing cover 52 shown in FIG. 8 for the prior art and the housing cover 152 shown in FIG. 10 for the present invention that the housing cover 152 has a plurality of stiffening ribs 154 formed integrally therewith. The function of these stiffening ribs 154 is to make the entire motor gearbox 120 in FIG. 6 more rigid than the entire prior art motor gearbox 20P in FIG. 3, and less flexible so that the motor gearbox 120 of the present invention can withstand vibrations and high loads, thus reducing wear and preventing premature failure.

Returning briefly to FIGS. 7 and 11, it can be seen that the prior art motor gearbox 20P has a third gear shaft 49 which supports the third gear 46 and the output pinion 23. The torque transmitted by the gearing produced reaction loads at the ends of the shaft 49, which reaction loads exceeded the load-carrying capability of the surface area of the shaft 49 in contact with the gearbox housing 26 and the housing cover 52. Consequently, excessive wear at the areas of contact resulted in premature failure of either the shaft 49, the gearbox housing 26, or the housing cover 52.

Returning now to FIGS. 9 and 12, it can be seen that the motor gearbox 120 of the present invention has a third gear shaft 149 which supports the third gear 146 and the output pinion 123. The increased torque-transmitting capabilities of the new output pinion 123 result in larger reaction loads at the ends of the shaft 149. Nevertheless, these larger reaction loads are handled by the increased diameter of the shaft 149 and the increased length of support of the shaft 149 in the gearbox housing 126 and in the housing cover 152.

As seen in FIG. 10, the length of support of the shaft 149 (not shown) is effectively extended by a boss 159 on the housing cover 152. Other bosses 119 effectively increase the length of support for other shafts (not shown) in the first gear/pinion cluster 142 and the second gear/pinion cluster 144. As seen in the prior art shown in FIG. 8, the housing cover 52 does not have any bosses whatsoever for effectively increasing the lengths of support for the shafts in the motor gearbox 20P.

By comparing the prior art motor gearbox 20P in FIG. 11 with the motor gearbox 120 of the present invention in FIG. 12, one can see that the gearing of the present invention is reversed from the gearing of the prior art. Specifically, in the prior art gearing of FIG. 11, the first gear 42G is above the second gear 44G which is below the third gear 46. On the other hand, in the gearing of the present invention as shown in FIG. 12, the first gear 142G is below the second gear 144G which is above the third gear 146.

As shown in FIG. 9, this gearing arrangement of the present invention allows the use of more heavy duty pinions and gears recessed in the thicker portion 150 of the gearbox housing 126. The use of this reversed gearing arrangement is most advantageous for the output pinion 123 and the output gear 147 in that the gearing arrangement permits the use of increased face widths without interfering with any of the required overall dimensional constraints of the motor gearbox 120 in the vending machine 10.

To summarize the operation of the invention, it should be pointed out that the stall is initiated when an item I becomes jammed in the spiral 32 of the vending machine 10. After the item I is jammed in the spiral 32, the torque of the DC electric motor 122 continues to increase as it attempts to continue to rotate the spiral 32. Eventually, the DC motor 122 reaches its maximum torque capacity and stalls. In the prior art device of FIGS. 7 and 11, the geartrain would fail before the DC motor 22 reached the stall point. In the present invention, the DC motor 122 reaches stall torque without any geartrain damage. Therefore, once the jammed item I is cleared from the spiral 32, the vending machine 10 can return to normal service without any repair being required.

The foregoing preferred embodiment is considered illustrative only. Numerous other modifications will readily occur to those persons skilled in the pertinent gear technology after reading the foregoing disclosure. Consequently, the disclosed invention is not limited by the exact structure and operating process shown and described, but rather is defined by the claims appended hereto.

I claim as my invention the following:

1. The electric motor gearbox for driving a product item in a vending machine, comprising:
   a. a gearbox housing;
   b. a minimotor mounted on the gearbox housing;
   c. a PC board means, connected to the minimotor and also mounted on the gearbox housing, for sending electrical signals to the minimotor;
   d. an assembly of gears mounted inside the gearbox housing and driven by the minimotor;
   e. an output pinion and gear means, arranged within the assembly of gears, for permitting the minimotor to stall before the assembly fails in response to jamming of the product item in the vending machine; and
   f. a cover means, secured to the gearbox housing, for providing rib means for stiffening the motor gearbox against excessive reaction loads.

2. The electric motor gearbox according to claim 1, wherein:
   said assembly of gears includes a third gear shaft.

3. The electric motor gearbox according to claim 2, further comprising:
   g. box means, formed integrally with the cover means, for extending the length of support for the third gear shaft.

4. An electric motor gearbox for driving a product item in a vending machine, comprising:
   a. a gearbox housing;
   b. a minimotor mounted on the gearbox housing;
   c. a PC board means, connected to the minimotor and also mounted on the gearbox housing, for sending electrical signals to the minimotor;
   d. an assembly of gears mounted inside the gearbox housing and driven by the minimotor, said assembly of gears including a third gear shaft;
   e. an output pinion and gear means, arranged within the assembly of gears, for permitting the minimotor to stall before the assembly fails in response to jamming of the product item in the vending machine, said output pinion and gear means having an output gear ratio of about 4.46 to 1;
   f. a cover means, secured to the gearbox housing, for providing rib means for stiffening the motor gearbox against excessive reaction loads; and
   g. boss means, formed integrally with the cover means, for extending the length of support for the third gear shaft;
   wherein said gearbox housing has a raised portion in which the output pinion and gear means are mounted.

* * * * *

UNITED STATES PATENT AND TRADEMARK OFFICE
CERTIFICATE OF CORRECTION

PATENT NO. : 5,172,605

DATED : December 22, 1992

INVENTOR(S) : Schwartz

It is certified that error appears in the above-identified patent and that said Letters Patent is hereby corrected as shown below:

```
Col. 4, line 17, after "gearbox", insert --housing--.

Col. 8, line 28, claim 3, change "box" to --boss--.
```

Signed and Sealed this

Second Day of November, 1993

Attest:

BRUCE LEHMAN

Attesting Officer     Commissioner of Patents and Trademarks